Aug. 14, 1934.  A. F. MICHLUN  1,970,178
SAFETY ANCHOR
Filed Dec. 26, 1933
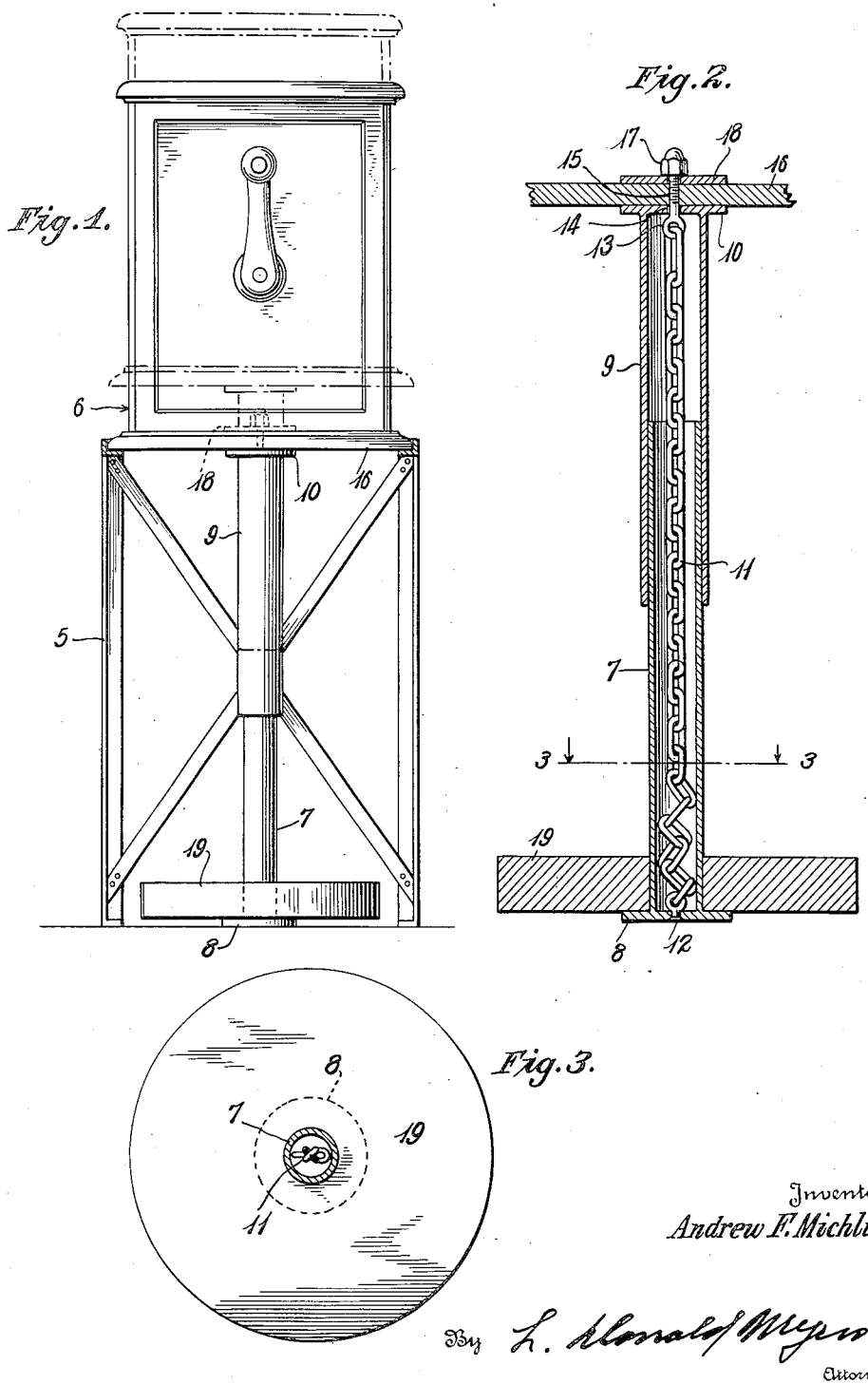
Inventor
Andrew F. Michlun
By L. Konald Myers
Attorney Patented Aug. 14, 1934

1,970,178

UNITED STATES PATENT OFFICE 1,970,178

SAFETY ANCHOR

Andrew F. Michlun, New York, N. Y., assignor to Anna Rita Michlun, Washington, D. C.

Application December 26, 1933, Serial No. 703,983

6 Claims. (Cl. 109—1)

This invention relates to new and useful improvements in safety anchors.

The primary object of the invention is to provide an anchor structure which will prevent the theft of a dispensing machine, or other object the owner of which is accustomed to leave standing before his place of business.

A further object of the invention is to provide a safety device of the above-mentioned type which cannot be broken, cut, or sufficiently damaged in any way to prevent it from successfully functioning as a safety anchor.

Other objects and advantages of the invention will be apparent during the course of the following description.

In the accompanying drawing forming a part of this specification and in which like numerals are employed to designate like parts throughout the same, Figure 1 is an elevational view of the safety anchor embodying this invention properly associated with the device intended to be protected from theft, Fig. 2 is a longitudinal sectional view of the safety anchor embodying this invention, and Fig. 3 is a transverse sectional view taken on line 3—3 of Fig. 2.

In the drawing, wherein for the purpose of illustration is shown a preferred embodiment of this invention, the reference 5 designates in its entirety a stand which is employed for supporting a suitable distance from the ground level a dispensing machine 6. It is to be understood that the stand 5 is merely employed to illustrate one form of support for the dispensing machine 6 and that the said machine may take the form of any other object which the owner desires to protect from theft.

The safety anchor includes a section of pipe 7 which has welded, or otherwise permanently secured to the lower end thereof a plate 8. A second pipe section 9, having a sufficiently large bore to telescopically receive the pipe section 7, is arranged in the manner illustrated in Figs. 1 and 2. The upper end of the pipe section 9 has welded, or otherwise permanently secured thereto, a plate 10. Positioned within the bores of the pipe sections 7 and 9 is a flexible element 11 which in the illustrated example consists of a section of link chain. This flexible element 11, however, may be formed of any other desired material, such as a strand of wire rope, or the like. The lower end of the chain or flexible element 11 is riveted or welded at one end to the plate 8, as illustrated at 12. The remaining end of the link chain or flexible element 11 is welded or otherwise permanently secured to the eye 13 of a bolt which passes upwardly through an aperture 14 formed in the plate 10 carried by the upper end of the larger pipe section 9. This bolt 15 is intended to be passed through an aperture formed in the bottom wall 16 of the object or dispensing machine 6. A nut 17 is threaded onto the projecting upper end of the bolt 15 to prevent withdrawal of the bolt from the elements 10 and 16. A metal washer or disk 18 is interposed between the inner face of the bottom wall 16 and the nut 17.

Prior to assembling the pipe sections and the chain, or flexible element, an anchor weight 19 is positioned upon the lower pipe section 7 to rest upon the plate 8. This anchor weight 19 may be of any desired shape or size and made from any preferred heavy material.

The length of the flexible element or sectional chain 11 is such that when connected at its opposite ends to the plates 8 and 10, the said element 11 will prevent complete separation of the pipe sections 7 and 9. Fig. 1 discloses in full lines the relative positions assumed by the pipe sections 7 and 9 when the dispensing machine, or other object, 6 is resting upon the top of the support 5. This figure shows in dotted lines the object 6 raised off of the support 5 to the extent permitted by the slack in the flexible element or link chain 11. The nut 17 preferably is located inside of the machine or object 6 in some position which will require the use of a special tool to loosen the same. This precaution is taken to prevent an unauthorized person from prying open any door the object 6 may be provided with to gain access to the nut 17. This location of the nut with reference to associated elements is not illustrated. It is impossible, due to the length of the chain 11 to cause complete separation of the telescoped ends of the pipe sections to permit any person to sever the chain by means of a wire cutter, or the like. Due to the looseness of the chain within the bores of the pipe sections, even when the said chain is drawn taut by lifting the object 6, a person will be prevented from cutting through the chain with a hack saw. The non-rigid nature of the chain will break hack saw blades when this type of tool is used.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described the invention, I claim:

1. A safety anchor of the type described comprising two pipe sections telescopically associated, a flexible element arranged within the bores of said pipe sections to permit limited longitudinal movement of the pipe sections to each other, means for connecting the ends of the flexible element to the outer ends of the pipe sections, and a weight secured against separation from said pipe sections.

2. A safety anchor of the type described comprising a pair of pipe sections telescopically associated with each other, means positioned within the pipe sections to permit limited longitudinal movement of the sections relative to each other, and a weight connected to the pipe sections.

3. In a safety anchor of the type described, a pair of telescopically associated pipe sections, a section of link chain positioned within the bores of the pipe sections, means for connecting the ends of the chain to the outer ends of the pipe sections to prevent complete separation of said sections, and a weight connected to said pipe sections against separation therefrom.

4. In a safety anchor of the type described, a pair of pipe sections telescopically associated with each other, a plate permanently connected to the outer end of each pipe section, a chain permanently connected at its opposite ends to said plates, said chain being of a proper length to prevent complete separation of the pipe sections, and a weight connected to the pipe sections against removal.

5. In combination, a support, an object resting upon the support, a pipe section connected to the object in a manner to prevent unauthorized separation, a second pipe section having an end telescopically associated with the lower end of the first mentioned pipe section, a flexible element connected at its opposite ends to portions of said pipe sections, said flexible element being of a proper length to prevent complete separation of the pipe sections, and a weight having an aperture for receiving the lower pipe section.

6. In a safety anchor, a support, an object resting on the support, a weight located exteriorly of the object, flexible means connected to the weight and the object to permit relative vertical movement between the weight and object, and an extensible casing for enclosing the flexible means.

ANDREW F. MICHLUN.